Patented Jan. 16, 1951

2,538,106

UNITED STATES PATENT OFFICE 2,538,106

N-METHYL-d-GLUCOSAMINE AND DERIVATIVES THEREOF

Frederick A. Kuehl, Jr., Westfield, N. J., assignor to Merck & Co., Inc., Rahway, N. J., a corporation of New Jersey No Drawing. Application February 1, 1946, Serial No. 645,008

8 Claims. (Cl. 260—211)

This invention relates to certain new chemical compounds, and to certain new and improved procedures by which they may be prepared from readily available starting materials. More particularly, it relates to the new chemical compound N-methyl-d-glucosamine, and to various acyl derivatives thereof. These compounds are potentially useful in the preparation of antibiotics which are therapeutically active against gram-positive organisms. Among such gram-positive organisms may be mentioned *Bacillus mycoides* and *Bacillus cereus*. Gram-negative organisms against which said antibiotics may possess therapeutic activity include *Pseudomonas fluorescens*, *Pseudomonas aeruginosa*, and *Serratia marcescens*. These new chemical compounds may be readily prepared by utilizing the known chemical compound d-glucosamine as the starting material.

In the preparation of N-methyl-d-glucosamine I treat d-glucosamine with a methylating agent. Among suitable methylating agents, dimethyl sulfate has been found most satisfactory.

The resulting N-methyl-d-glucosamine may then readily be converted to a mixture of the $\alpha$ and $\beta$ forms of the pentaacetyl derivatives of N-methyl-d-glucosamine by acetylation. Ordinarily it is preferred to carry out the acetylation using, as the acetylating agent, a mixture of pyridine and acetic anhydride. When the mixture of the $\alpha$ and $\beta$ isomers is treated with zinc chloride and acetic anhydride, the mixture is converted predominantly to the $\alpha$ form, which may then be recovered in substantially pure form by recrystallization from methanol and/or by chromatographic methods using acid-washed alumina as the adsorbent.

My improved process for making N-methyl-d-glucosamine, and its pentaacyl derivatives, will be clear from the following example, which is intended to be illustrative but not restrictive.

Example 5 grams of d-glucosamine hydrochloride were dissolved in 25 cc. of 1.0 N sodium hydroxide solution. The solution was then shaken with 2.5 cc. of dimethyl sulfate at room temperature for one-half hour. The resulting solution was then concentrated to dryness, and the residue triturated with 10 cc. of alcohol. It was then filtered. The alcohol soluble material was then acetylated using a mixture of 30 cc. of pyridine and 20 cc. of acetic anhydride as the acetylating agent. This step was carried out at room temperature, while allowing the mixture to stand overnight.

The solvents were then removed under reduced pressure less than atmospheric, and the residue dissolved in 20 cc. of water. It was then extracted with chloroform from the aqueous solution. The crude acetylation product consisted of a mixture of the $\alpha$ and $\beta$ pentaacetyl derivatives of N-methyl-d-glucosamine. The acetylation product was heated on the steam bath with 1 gram of zinc chloride dissolved in 25 cc. of acetic anhydride for a period of 1 hour. The acetic anhydride was then removed under reduced pressure, and the residue dissolved in about 20 cc. of water. It was then extracted with chloroform from this aqueous solution.

The chloroform extract was washed, successively, with aqueous sodium bicarbonate, dilute hydrochloric acid and water. An ether solution of the chloroform residue deposited 2.4 grams of crystals consisting substantially of a mixture of the $\alpha$ and $\beta$ forms of N-methyl-pentaacetyl-d-glucosamine. The melting point of the product was 145–146° C. and the specific rotation $(\alpha)_D = 99°$ (concentration 0.7% in chloroform).

The product was purified by alternate recrystallizations from a mixture of about 5 cc. of chloroform and about 20 cc. of ethyl ether, the final recrystallization being from methanol. It was then chromatographed in ether-chloroform solution (1:1) on acid-washed alumina, the ether-chloroform solution passing through alumina yielding the pure pentaacetyl-N-methyl-$\alpha$-d-glucosamine having a melting point of 160.5–161.5° C. Specific rotation was $$(\alpha)_D = +101°$$

(concentration 0.6% in chloroform).

It is obvious that various changes and modifications might be made in my invention as described without departing from the scope thereof as defined in the appended claims.

I claim:

1. The process of recovering substantially pure pentaacetyl-N-methyl-$\alpha$ d-glucosamine from a mixture of this compound with pentaacetyl N-methyl-$\beta$ d-glucosamine which comprises recrystallizing the desired compound from a mixture of chloroform and ethyl ether, again recrystallizing the desired compound from methanol dissolving said compound in 1:1 chloroform-ethyl ether, and then securing the desired compound from the mixture by chromatographic separation on acid-washed alumina.

2. The process of converting a mixture of the $\alpha$ and $\beta$ isomers of pentaacetyl-N-methyl-d-glucosamine to a form in which the $\alpha$ isomer predominates which comprises treating said mixture with zinc chloride and acetic anhydride.

3. The process of recovering substantially pure pentaacetyl-N-methyl-α-d-glucosamine from a mixture of said isomer with pentaacetyl-N-methyl-β-d-glucosamine which comprises treating said mixture with zinc chloride and acetic anhydride in order to convert said mixture to one in which said α-isomer predominates, and securing said substantially pure pentaacetyl-N-methyl-α d-glucosamine from said product by repeated crystallization.

4. The process of recovering substantially pure pentaacetyl-N-methyl-β d-glucosamine from a mixture of said isomer with pentaacetyl-N-methyl α-d-glucosamine which comprises treating said mixture with zinc chloride and acetic anhydride in order to convert said mixture to one in which said α-isomer predominates dissolving said mixture in 1:1 chloroform-ethyl ether, and securing said substantially pure pentaacetyl-α-d-N-methyl glucosamine from said resulting mixture by chromatography on acid-washed alumina.

5. The process of recovering substantially pure pentaacetyl-N-methyl-α d-glucosamine from a mixture of said isomer with pentaacetyl-N-methyl-β d-glucosamine which comprises treating said mixture with zinc chloride and acetic anhydride in order to convert said mixture to one in which said α-isomer predominates, and securing said substantially pure pentaacetyl-N-methyl α d-glucosamine from said product by repeated crystallization, from a chloroform-ethyl ether mixture and from methanol.

6. The process for the preparation of pentaacetyl N-methyl-α-d-glucosamine which comprises treating a salt of d-glucosamine with a methylating agent, said reaction being carried out in an alkaline solution and at room temperature, concentrating the resulting solution, dissolving the residue in alcohol, acetylating the alcohol soluble material in the presence of pyridine, heating the acetylation product with zinc chloride and acetic anhydride and recovering pentaacetyl N-methyl-α-d-glucosamine.

7. The process for the preparation of pentaacetyl N-methyl-α-d-glucosamine which comprises treating a salt of d-glucosamine with dimethyl sulfate, said reaction being carried out in an alkaline solution and at room temperature, concentrating the resulting solution, dissolving the residue in alcohol, acetylating the alcohol soluble material in the presence of pyridine, heating the acetylation product with zinc chloride and acetic anhydride and recovering pentaacetyl N-methyl-α-d-glucosamine.

8. The process for the preparation of pentaacetyl N-methyl-d-glucosamine which comprises treating a salt of d-glucosamine with dimethyl sulfate in an alkaline solution and at room temperature, concentrating the resulting solution, dissolving the residue in alcohol and acetylating the alcohol soluble material in the presence of pyridine to produce pentaacetyl N-methyl d-glucosamine.

FREDERICK A. KUEHL, Jr.

REFERENCES CITED

The following references are of record in the file of this patent:

Votacek et al., Colection Trav. Chim. Tchecoslovaquie, vol. 6, pages 77 to 96; vol 7, pages 424 to 429; vol. 9, pages 109 to 119.

Ullmann et al., volume 33, page 2476 (1900).

E. Fischer, Ber. Deut. Chem., vol. 35, page 3790 (1902).

Jour. Chem. Soc., vol. 101, (1912), pages 1139, 1140, 2 pages.

Hudson et al., J. A. C. S., vol. 37, (1915) pages 1267–1269, 3 pages.

Jour. Chem. Soc. (1937), page 1979.

Jour. Chem. Soc. 101 (1912), pages 1141, 1142.